US007660362B2

(12) United States Patent
Kim

(10) Patent No.: US 7,660,362 B2
(45) Date of Patent: Feb. 9, 2010

(54) WIRELESS LOCAL AREA NETWORK SYSTEM USING SPACE-TIME BLOCK CODING (STBC) HAVING BACKWARD COMPATIBILITY WITH PRIOR STANDARDS

(75) Inventor: Joonsuk Kim, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 869 days.

(21) Appl. No.: 10/995,212

(22) Filed: Nov. 24, 2004

(65) Prior Publication Data

US 2005/0281354 A1  Dec. 22, 2005

Related U.S. Application Data

(60) Provisional application No. 60/581,122, filed on Jun. 18, 2004.

(51) Int. Cl.
    *H04B 7/02* (2006.01)
(52) U.S. Cl. ............... 375/267; 375/299; 455/101
(58) Field of Classification Search ........... 375/267, 375/299; 455/101
    See application file for complete search history.

(56) References Cited

U.S. PATENT DOCUMENTS

| 6,775,329 | B2 * | 8/2004 | Alamouti et al. ............ 375/267 |
|---|---|---|---|
| 7,050,768 | B2 * | 5/2006 | Hosur et al. ............... 455/103 |
| 7,324,785 | B2 * | 1/2008 | Hansen et al. ............... 455/69 |
| 7,577,085 | B1 * | 8/2009 | Narasimhan ............... 370/206 |
| 2002/0193146 | A1 * | 12/2002 | Wallace et al. ............ 455/562 |
| 2003/0185241 | A1 * | 10/2003 | Lu et al. ..................... 370/476 |
| 2003/0235147 | A1 * | 12/2003 | Walton et al. ............... 370/204 |
| 2005/0135318 | A1 * | 6/2005 | Walton et al. ............... 370/338 |
| 2005/0195733 | A1 * | 9/2005 | Walton et al. ............... 370/208 |
| 2005/0233709 | A1 * | 10/2005 | Gardner et al. ............. 455/101 |
| 2005/0259567 | A1 * | 11/2005 | Webster et al. ............. 370/208 |
| 2005/0286474 | A1 * | 12/2005 | van Zelst et al. ........... 370/334 |

(Continued)

FOREIGN PATENT DOCUMENTS

EP    1 073 294 A1    1/2001

OTHER PUBLICATIONS

Jianhua, "A MIMO system with backward compatibility for OFDM based WLANs", 4th IEEE Workshop on Signal Processing Advances in Wireless Communications, 2003, SPAWC 2003, Jun. 15-18, 2003 pp. 130-134.*

(Continued)

*Primary Examiner*—Juan A Torres
(74) *Attorney, Agent, or Firm*—McAndrews, Held & Malloy, Ltd.

(57) ABSTRACT

A method of communicating data to a receiving antenna from N transmitting antennas, where N is an integer, includes the steps of determining whether a legacy transmission mode has been selected, producing N data streams from outbound data, and applying the N data streams to a space/time encoder to produce N encoded signals. When the legacy transmission mode has not been selected, the N encoded signals are transmitting from N transmitting antennas and when the legacy transmission mode has been selected, the one encoded signal is transmitted from one of the N transmitting antennas. The legacy transmission mode allows receivers to receive and process transmitted signals when the receivers are only configured to receive the transmitted signals from a single transmitting antenna.

24 Claims, 8 Drawing Sheets

U.S. PATENT DOCUMENTS

2006/0251193 A1* 11/2006 Kopmeiners et al. ........ 375/345
2006/0252386 A1* 11/2006 Boer et al. ................. 455/101

OTHER PUBLICATIONS

Alamouti, "A simple transmit diversity technique for wireless communications", IEEE Journal on Selected Areas in Communications, Publication Date: Oct. 1998, vol. 16, Issue: 8 on pp. 1451-1458.*

Jianhua Liu , "A MIMO system with backward compatibility for OFDM based WLANs", EURASIP Journal on Applied Signal Processing archive vol. 2004, (Jan. 2004) pp. 696-706.*

"Bluetooth Will Co-Exist: Study," Matthew Peretz, see www.80211-planet.com/news/print/0,,1481_913471.html, Aug. 21, 2002.

"Bluetooth and 802.11: A Tale of Two Technologies," see www.10meters.com/blue_802.html, Aug. 21, 2002.

"Bluetooth and Wi-Fi: Friends or Foes?" see www.nwfusion.com/cgi-bin/mailto/x.cgi, Aug. 21, 2002.

"Anatomy of IEEE 802.11b Wireless," see www.networkcomp;uting.com/shared/printArticlejhtml?.../115ws2full.html, Aug. 21, 2002.

"Report: IBM, Intel, cell companies eye national Wi-Fi net," see www.computerworld.com/mobiletopics/mobile/story/0,10801,72752,00.html, Aug. 7, 2002.

"Vendors field new Wireless LAN Security Products," see www.computerworld.com/mobiletopics/mobile/technology/story/0,10801,72912,00.html, Jul. 22, 2002.

"Microsoft Plans Foray Into Home WLAN Device Market," see www.computerworld.com/networkingtopics/networking/lanwan/story/0,10801,72890.html, Jul. 22, 2002.

"Simple 802.11b Wireless Ethernet Network with an Access Point," see www.homenethelp.com/web/diagram/access-point.asp, Aug. 20, 2002.

"How Wireless Networking Works," see www.howstuffworks.com/wireless-network.htm/printable.html, Aug. 15, 2002.

"Bridging a Wireless 802.11b Network with a Wired Ethernet Network," see www.homenethelp.com/web/diagram/wireless-bridged.asp, Aug. 20, 2002.

"Wireless Access Point (802.11b) of the Router Variety," see www.homenethelp.com/web/diagram/share-wireless-ap.asp, Jul. 22, 2002.

"Ultrawideband May Thwart 802.11, Bluetooth Efforts," see www.currenti...?magazinearticle.asp?magazinearticleid=140454&magazineid=7$mode=prin, Feb. 11, 2002.

"Brief Tutorial on IEEE 802.11 Wireless LANs," intersil™, Feb. 1999.

"Wireless Data Blaster," Scientific American.com, David G. Leeper, May 4, 2002.

"Increasing Data Rate Over Wireless Channels," Ayman F. Naguilo, et al., IEEE Signal Processing Magazine, May 2000.

"Efficient Adaptive Receivers for Joint Equalization and Interference Cancellation in Multiuser Space-Time-Block-Coded Systems," Waleed M. Younis, et al., IEEE Transactions of Signal Processing, vol. 51, No. 11, Nov. 2003.

"PAWNs: Satisfying the Need for Ubiquitous Secure Connectivity and Location Services," Paramvir Bahl, et al., IEEE Wireless Communications, Feb. 2002.

"WLAN-GPRS Integration for Next-Generation Mobile Data Networks," Apostolis K. Salkintzis, et al., IEEE Wireless Communications, Oct. 2002.

Peretz, Matthew, "Bluetooth Will Co-Exist: Study," pp. 1-2 published by www.80211planet.com, Oct. 30, 2001, see http://www.80211-planet.com/news/print/01481_913471,00.html.

"Bluetooth and 802.11" A Tale of Two Technologies, pp. 1-2, published by www.10meters.com, 2000-2001, see http://www.10meters.com/blue_802.html.

Shaw, Keith, "Bluetooth and Wi-Fi: Friends or foes?" pp. 1-2, published by NetworkWorldFusion, Jun. 18, 2001, see http://www.nwfusion.com/cgi-bin/mailto/x.cgi.

Conover, Joel, "Anatomy of IEEE 80211b Wireless," pp. 1-4, published by www.networkcomputing.com, Aug. 7, 2000, see http://www.networkcomputing.com/shared/printArticle.jhtml?.../1115ws2full.html&pub=nw.

Brewin, Bob, "Report: IBM, Intel, cell companies eye national Wi-Fi net," pp. 1-2, published by www.computerworld.com, Jul. 16, 2002, see http://www.computerworld.com/mobiletopics/mobile/story/0,10801,72752,00.html.

Brewin, Bob, "Vendors field new Wireless LAN Security Products," pp. 1-3, published by www.computerworld.com, Jul. 22, 2002, see http://www.computerworld.com/mobiletopics/mobile/technology/story/0,10801,72912,00.html.

Brewin, Bob, "Microsoft Plans Foray Into Home WLAN Device Market," pp. 1-3, published by www.computerworld.com, Jul. 22, 2002, see http://www.computerworld.com/networkingtopics/networking/lanwan/story/0,10801,72890,html.

"Simple 802.11b Wireless Ethernet Network with an Access Point," pp. 1-2, published by Home Network Diagrams, 2001, see http://www.homenethelp.com/web/diagram/access-point.asp.

Tyson, Jeff, "How Wireless Networking Works," pp. 1-6, published by Howstuffworks, Inc., 1998-2002, see http://www.howstuffworks.com/wireless-network.htm/printable.html.

"Bridging a Wireless 802.11b Network with a Wired Ethernet Network," pp. 1-2, published by Home Network Diagrams, 2001, see http://www.homenethelp.com/web/diagram/wireless-bridged.asp.

"Wireless Access Point (802.11b) of the Router Variety," pp. 1-2, published by Home Network Diagrams, 2001, see http://www.homenethelp.com/web/diagram/share-wireless-ap.asp.

Jackson, Donny, "Ultrawideband May Thwart 802.11, Bluetooth Efforts," pp. 1-2, published by Telephony, Feb. 11, 2002, see http://currenti.../magazinearticle.asp?magazinearticleid=140454&magazineid=7&mode=prin.

* cited by examiner

| STS 1001 | LTS 1002 | Signal 1003 | Data 1005 |

| STS 1001 | LTS 1002 | Signal 1003 | LTS 1006 | Data 1007 |

WIRELESS LOCAL AREA NETWORK SYSTEM USING SPACE-TIME BLOCK CODING (STBC) HAVING BACKWARD COMPATIBILITY WITH PRIOR STANDARDS

REFERENCE TO RELATED APPLICATIONS

This application claims priority of U.S. Provisional Patent Application Ser. No. 60/581,122, filed on Jun. 18, 2004. The subject matter of this earlier filed application is hereby incorporated by reference.

BACKGROUND OF THE INVENTION

1. Technical Field of the Invention

This invention relates generally to wireless communication systems and more particularly to a transmitter transmitting at high data rates with such wireless communication systems.

2. Description of Related Art

Communication systems support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, BLUETOOTH™, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

For each wireless communication device to participate in wireless communications, it may include a built-in radio transceiver (i.e., receiver and transmitter) or may be coupled to an associated radio transceiver (e.g., a station for in-home and/or in-building wireless communication networks, RF modem, etc.). The transmitter may include a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

The transmitter may include a data modulation stage, one or more intermediate frequency stages, and a power amplifier. The data modulation stage can convert raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

The transmitter includes at least one antenna for transmitting the RF signals, which are received by a single antenna, or multiple antennas, of a receiver. When the receiver includes two or more antennas, the receiver will select one of them to receive the incoming RF signals. In this instance, the wireless communication between the transmitter and receiver is a single-output-single-input (SOSI) communication, even if the receiver includes multiple antennas that are used as diversity antennas (i.e., selecting one of them to receive the incoming RF signals). For SISO wireless communications, a transceiver includes one transmitter and one receiver.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennas and two or more receiver paths. Each of the antennas receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennas to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

In addition, current wireless local area network standards also need to be considered. With respect to IEEE 802.11a, such communication can operate at 5 GHz frequency bands, which can achieve up to 54 Mbps based on Orthogonal Frequency Division Multiplexing (OFDM). With respect to IEEE 802.11b, such communication can operate at 2.4 GHz, which can achieve up to 11 Mbps based on DSSS-CCK (Direct Sequence Spread Spectrum—Complementary Code Keying). Both types of wireless communication been widely used. In order to achieve the higher data rates at 2.4 GHz, IEEE 802.11g was approved in 2003 by adopting OFDM to achieve 54 Mbps. For coexistence with existing 802.11b system in 2.4 GHz bands, 802.11g was designed to have backward compatibility. Such systems are all SISO systems.

Giving consideration to more reliable and faster data transmission systems, MIMO may be applied in IEEE 802.11n. Among many other techniques considered, Space-Time Block Coding (STBC) is one of popular choices to enhance the transmission coverage. However, due to the unique design of STBC over pairs of transmit antennas, the MIMO may be bulky to utilize STBC MIMO design to enhance the coverage, as well as 5150 design for existing IEEE 802.11a/b/g. In order to have additional data paths, there may be additional costs to including both legacy and STBC implementations. Therefore, there is a need for simpler approaches that allow for backward compatibility and simplicity of design.

BRIEF SUMMARY OF THE INVENTION

According to one embodiment of the present invention, A method of communicating data to a receiving antenna from N transmitting antennas, where N is an integer, includes the steps of determining whether a legacy transmission mode has been selected, producing N data streams from outbound data, and applying the N data streams to a space/time encoder to produce N encoded signals. When the legacy transmission mode has not been selected, the N encoded signals are transmitting from N transmitting antennas and when the legacy transmission mode has been selected, the one encoded signal is transmitted from one of the N transmitting antennas. The legacy transmission mode allows receivers to receive and process transmitted signals when the receivers are only configured to receive the transmitted signals from a single transmitting antenna.

Also, when the legacy transmission mode has not been selected, the step of applying the N data streams to the space/time encoder includes producing at least one conjugate encoded signal or adding a Long Training Sequence immediately before data in a frame. Additionally, the step of adding a Long Training Sequence may be performed such that a receiver processor will process the frame in a Space/Time Block Coding mode. Also, when the legacy transmission mode has not been selected, the step of applying the N data streams to the space/time encoder may include encoding the two data streams so that channel estimates can be performed by the receivers according to:

$$\begin{bmatrix} \tilde{h}_1 \\ \tilde{h}_2 \end{bmatrix} = C^* \times \begin{bmatrix} r(t_0) \\ r(t_1) \end{bmatrix} = \begin{bmatrix} \sum_{i=1}^{2} |c(t_i)|^2 & 0 \\ 0 & \sum_{i=1}^{2} |c(t_i)|^2 \end{bmatrix} \times \begin{bmatrix} h_1 \\ h_2 \end{bmatrix} + \begin{bmatrix} \tilde{n}_1 \\ \tilde{n}_2 \end{bmatrix}, \text{ where}$$

$$\begin{bmatrix} r(t_0) \\ r(t_1) \end{bmatrix} = \begin{bmatrix} c(t_0) & -c^*(t_1) \\ c(t_1) & c^*(t_0) \end{bmatrix} \begin{bmatrix} h_1 \\ h_2 \end{bmatrix} + \begin{bmatrix} n_1 \\ n_2 \end{bmatrix} = C \times \begin{bmatrix} h_1 \\ h_2 \end{bmatrix} + \begin{bmatrix} n_1 \\ n_2 \end{bmatrix}$$

where $r_i(t)$ and $c_i(t)$ are the received and transmitted signals, respectively, $n_i$ represent noise terms and $h_i$ represents relationships between signals sent from the two transmitting antennas to the receiving antenna.

Additionally, when the legacy transmission mode has been selected, the receivers which are capable of processing a data frame in a Space/Time Block Coding mode bypass the Space/Time Block Coding mode. Also, the receivers that are only configured to receive the transmitted signals from a single transmitting antenna may be receivers that comply with standards of IEEE 802.11. In addition, the step of applying the N data streams to the space/time encoder may include encoding the two data streams so that data can be retrieved by the receivers according to:

$$\begin{bmatrix} \tilde{c}(t_0) \\ \tilde{c}^*(t_1) \end{bmatrix} = H^* \times \begin{bmatrix} r(t_0) \\ r^*(t_1) \end{bmatrix} = \begin{bmatrix} \sum_{i=1}^{2} |h_i|^2 & 0 \\ 0 & \sum_{i=1}^{2} |h_i|^2 \end{bmatrix} \times \begin{bmatrix} c(t_0) \\ c^*(t_1) \end{bmatrix} + \begin{bmatrix} \tilde{n}_1 \\ \tilde{n}_2 \end{bmatrix}.$$

According to another embodiment, a transmitter for communicating data to a receiving antenna from N transmitting antennas, where N is an integer, includes determining means for determining whether a legacy transmission mode has been selected, producing means for producing N data streams from outbound data, encoding means for space/time encoding the N data streams to produce N encoded signals and N transmitting antenna means for transmitting the N encoded signals or one signal. The N encoded signals are transmitted from N transmitting antenna means when the legacy transmission mode has not been selected, the one encoded signal is transmitted from one of the N transmitting antenna means when the legacy transmission mode has been selected, and the legacy transmission mode allows receivers to receive and process transmitted signals when the receivers are only configured to receive the transmitted signals from a single transmitting antenna.

According to another embodiment, a transmitter for communicating data to a receiving antenna from N transmitting antennas, where N is an integer, includes a legacy switch indicator, configured to determine whether a legacy transmission mode has been selected, a demultiplexer, configured to produce N data streams from outbound data, a space/time encoder, configured to encode the N data streams to produce N encoded signals and N transmit antennas, configured to transmit the N encoded signals or one signal. The N encoded signals are transmitted from N transmit antennas when the legacy transmission mode has not been selected, one encoded signal is transmitted from one of the N transmit antennas when the legacy transmission mode has been selected, and the legacy transmission mode allows receivers to receive and process transmitted signals when the receivers are only configured to receive the transmitted signals from a single transmitting antenna.

BRIEF DESCRIPTION OF THE DRAWINGS

For the present invention to be easily understood and readily practiced, the present invention will now be described, for purposes of illustration and not limitation, in conjunction with the following figures.

DETAILED DESCRIPTION OF THE PREFERRED EMBODIMENTS

Figure 1:
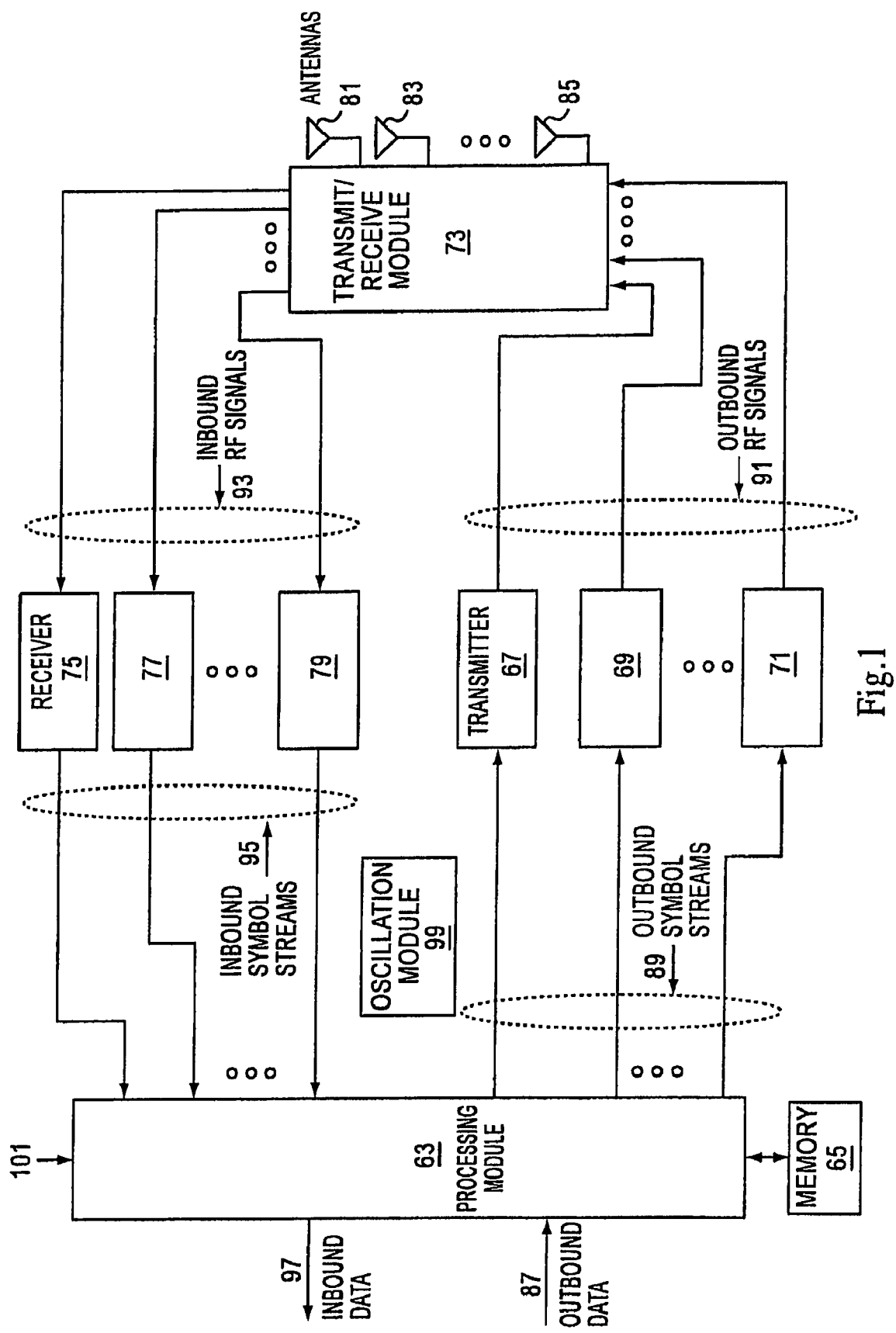
FIG. 1 is a schematic block diagram of a wireless communication device in accordance with one embodiment of the present invention.

FIG. 1 is a schematic block diagram illustrating a wireless communication device, according to an example of the invention. The device includes a baseband processing module 63, memory 65, a plurality of radio frequency (RF) transmitters 67, 69, 71, a transmit/receive (T/R) module 73, a plurality of antennas 81, 83, 85, a plurality of RF receivers 75, 77, 79, and a local oscillation module 99. The baseband processing module 63, in combination with operational instructions stored in memory 65, execute digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and/or digital baseband to IF conversion. The baseband processing module 63 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 65 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 63 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the baseband processing module 63 receives the outbound data 87 and, based on a mode selection signal 101, produces one or more outbound symbol streams 89. The mode selection signal 101 will indicate a particular mode as are indicated in mode selection tables. For example, the mode selection signal 101 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. A code rate is supplied as well as number of coded bits per subcarrier (NBPSC), coded bits per OFDM symbol (NCBPS), data bits per OFDM symbol (NDBPS), error vector magnitude in decibels (EVM), sensitivity which indicates the maximum receive power required to obtain a target packet error rate (e.g., 10% for IEEE 802.11a), adjacent channel rejection (ACR), and an alternate adjacent channel rejection (AACR).

The mode selection signal may also indicate a particular channelization for the corresponding mode. The mode select signal may further indicate a power spectral density mask value. The mode select signal may alternatively indicate a rate that has a 5 GHz frequency band, 20 MHz channel bandwidth and a maximum bit rate of 54 megabits-per-second. As a further alternative, the mode select signal 101 may indicate a 2.4 GHz frequency band, 20 MHz channels and a maximum bit rate of 192 megabits-per-second. A number of antennas may be utilized to achieve the higher bandwidths. In this instance, the mode select would further indicate the number of antennas to be utilized. Another mode option may be utilized where the frequency band is 2.4 GHz, the channel bandwidth is 20 MHz and the maximum bit rate is 192 megabits-per-second. Various bit rates ranging from 12 megabits-per-second to 216 megabits-per-second utilizing 2-4 antennas and a spatial time encoding rate may be employed. The mode select signal 101 may further indicate a particular operating mode, which corresponds to a 5 GHz frequency band having 40 MHz frequency band having 40 MHz channels and a maximum bit rate of 486 megabits-per-second. The bit rate may range, in this example, from 13.5 megabits-per-second to 486 megabits-per-second utilizing 1-4 antennas and a corresponding spatial time code rate.

The baseband processing module 63, based on the mode selection signal 101 produces the one or more outbound symbol streams 89 from the output data 88. For example, if the mode selection signal 101 indicates that a single transmit antenna is being utilized for the particular mode that has been selected, the baseband processing module 63 will produce a single outbound symbol stream 89. Alternatively, if the mode select signal indicates 2, 3 or 4 antennas, the baseband processing module 63 will produce 2, 3 or 4 outbound symbol streams 89 corresponding to the number of antennas from the output data 87.

Depending on the number of outbound streams 89 produced by the baseband module 63, a corresponding number of the RF transmitters 67, 69, 71 can be enabled to convert the outbound symbol streams 89 into outbound RF signals 91. The implementation of the RF transmitters 67, 69, 71 will be further described with reference to FIG. 2. The transmit/receive module 73 receives the outbound RF signals 91 and provides each outbound RF signal to a corresponding antenna 81, 83, 85.

When the radio 60 is in the receive mode, the transmit/receive module 73 receives one or more inbound RF signals via the antennas 81, 83, 85. The T/R module 73 provides the inbound RF signals 93 to one or more RF receivers 75, 77, 79. The RF receiver 75, 77, 79, which will be described in greater detail with reference to FIG. 4, converts the inbound RF signals 93 into a corresponding number of inbound symbol streams 95. The number of inbound symbol streams 95 will correspond to the particular mode in which the data was received. The baseband processing module 63 receives the inbound symbol streams 95 and converts them into inbound data 97.

As one of average skill in the art will appreciate, the wireless communication device of FIG. 1 may be implemented using one or more integrated circuits. For example, the device may be implemented on one integrated circuit, the baseband processing module 63 and memory 65 may be implemented on a second integrated circuit, and the remaining components, less the antennas 81, 83, 85, may be implemented on a third integrated circuit. As an alternate example, the device may be implemented on a single integrated circuit.

Figure 2A:
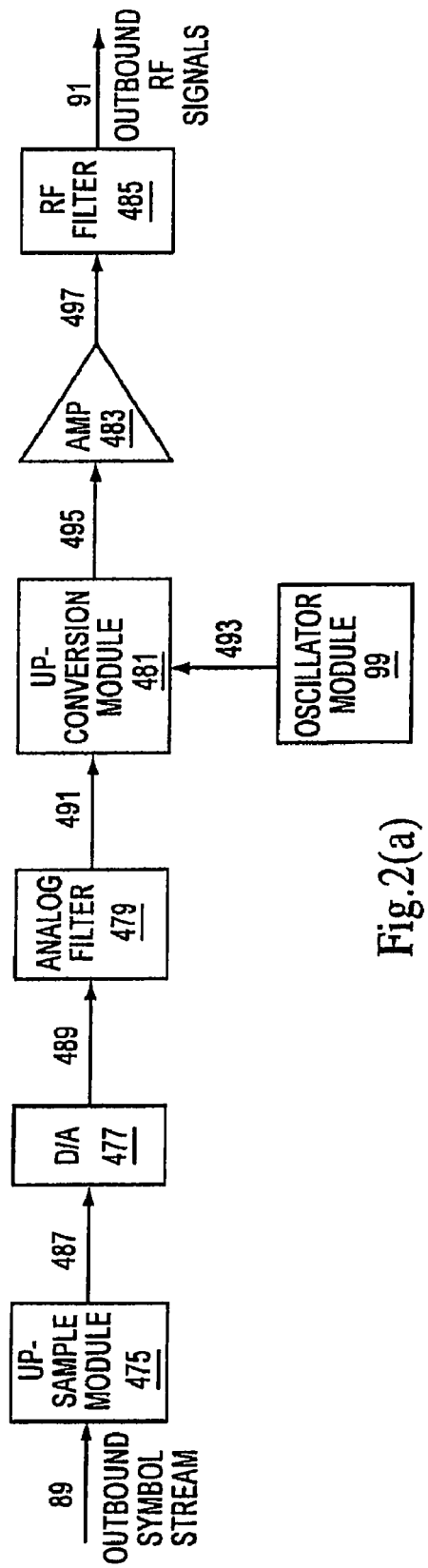
FIG. 2 illustrates schematic block diagrams of a transmitter and receiver, with FIG. 2(a) providing a schematic block diagram of an RF transmitter and with FIG. 2(b) providing a schematic block diagram of an RF receiver, in accordance with embodiments of the present invention.

FIG. 2(a) is a schematic block diagram of an embodiment of an RF transmitter 67, 69, 71. The RF transmitter may include a digital filter and up-sampling module 475, a digital-to-analog conversion module 477, an analog filter 479, and up-conversion module 481, a power amplifier 483 and a RF filter 485. The digital filter and up-sampling module 475 receives one of the outbound symbol streams 89 and digitally filters it and then up-samples the rate of the symbol streams to a desired rate to produce the filtered symbol streams 487. The digital-to-analog conversion module 477 converts the filtered symbols 487 into analog signals 489. The analog signals may include an in-phase component and a quadrature component.

The analog filter 479 filters the analog signals 489 to produce filtered analog signals 491. The up-conversion module 481, which may include a pair of mixers and a filter, mixes the filtered analog signals 491 with a local oscillation 493, which is produced by local oscillation module 99, to produce high frequency signals 495. The frequency of the high frequency signals 495 corresponds to the frequency of the RF signals 91.

The power amplifier 483 amplifies the high frequency signals 495 to produce amplified high frequency signals 497. The RF filter 485, which may be a high frequency band-pass filter, filters the amplified high frequency signals 497 to produce the desired output RF signals 91.

As one of average skill in the art will appreciate, each of the radio frequency transmitters 67, 69, 71 will include a similar architecture as illustrated in FIG. 2(a) and further include a shut-down mechanism such that when the particular radio frequency transmitter is not required, it is disabled in such a manner that it does not produce interfering signals and/or noise.

Figure 2B:
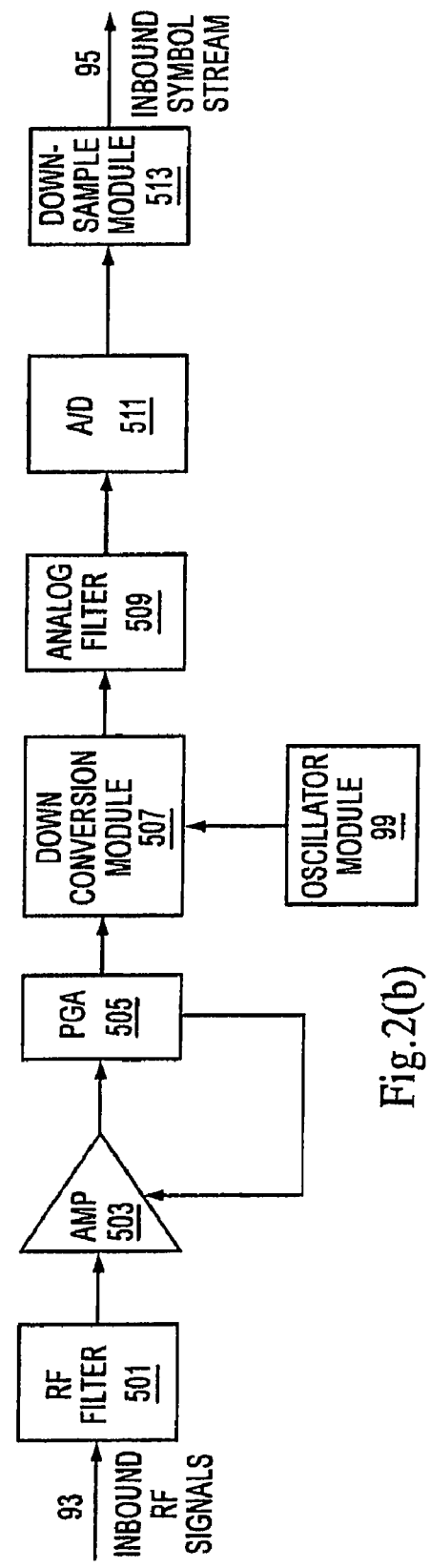

FIG. 2(b) is a schematic block diagram of each of the RF receivers 75, 77, 79. In this embodiment, each of the RF receivers may include an RF filter 501, a low noise amplifier (LNA) 503, a programmable gain amplifier (PGA) 505, a down-conversion module 507, an analog filter 509, an analog-to-digital conversion module 511 and a digital filter and down-sampling module 513. The RF filter 501, which may be a high frequency band-pass filter, receives the inbound RF signals 93 and filters them to produce filtered inbound RF signals. The low noise amplifier 503 amplifies the filtered inbound RF signals 93 based on a gain setting and provides the amplified signals to the programmable gain amplifier 505. The programmable gain amplifier further amplifies the inbound RF signals 93 before providing them to the down-conversion module 507.

The down-conversion module 507 includes a pair of mixers, a summation module, and a filter to mix the inbound RF signals with a local oscillation (LO) that is provided by the local oscillation module to produce analog baseband signals. The analog filter 509 filters the analog baseband signals and provides them to the analog-to-digital conversion module 511 which converts them into a digital signal. The digital filter and down-sampling module 513 filters the digital signals and then adjusts the sampling rate to produce the inbound symbol stream 95.

Figure 3A:
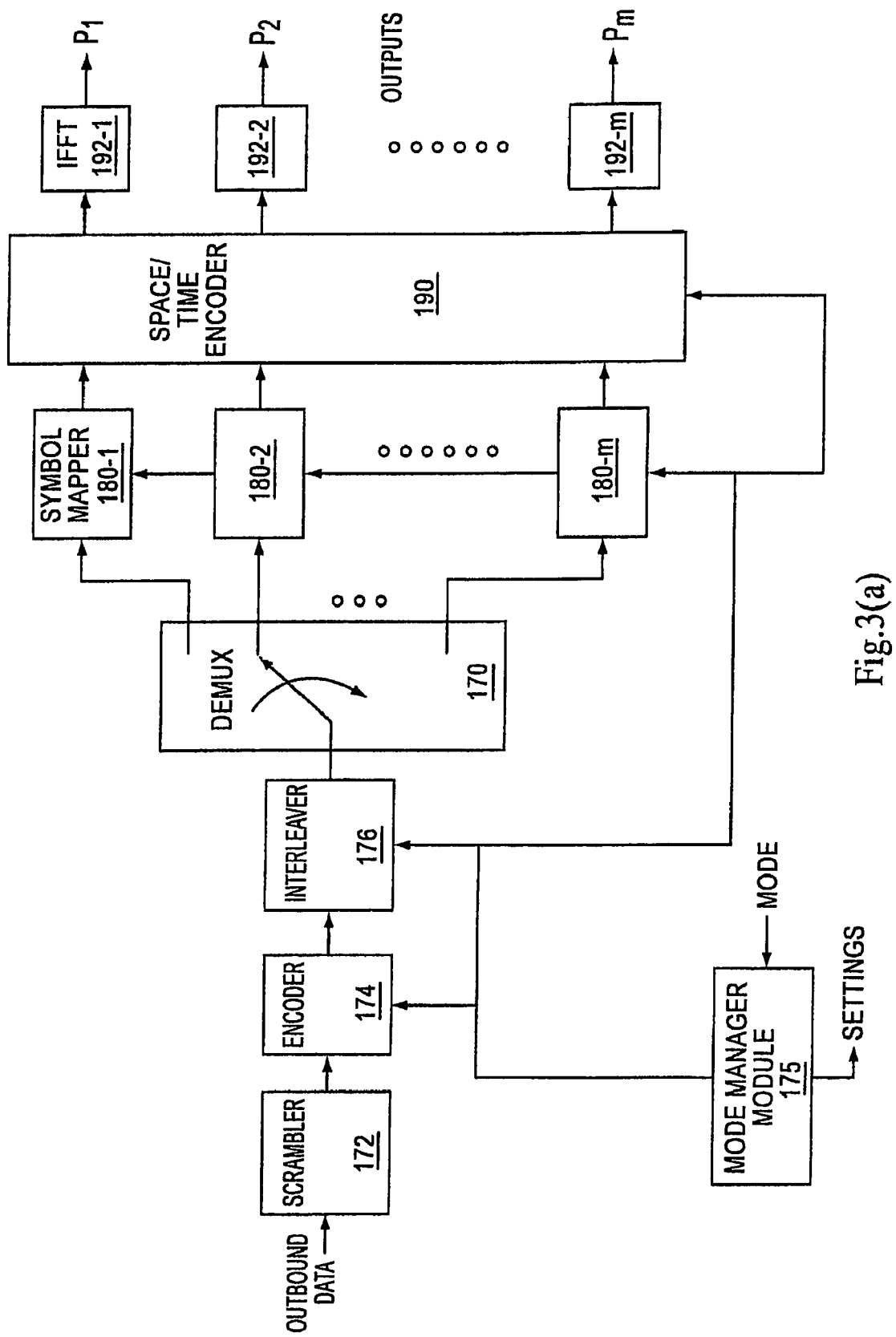
FIGS. 3(a) and 3(b) are a schematic block diagram of a transmitter in accordance one embodiment of with the present invention.
Figure 3B:
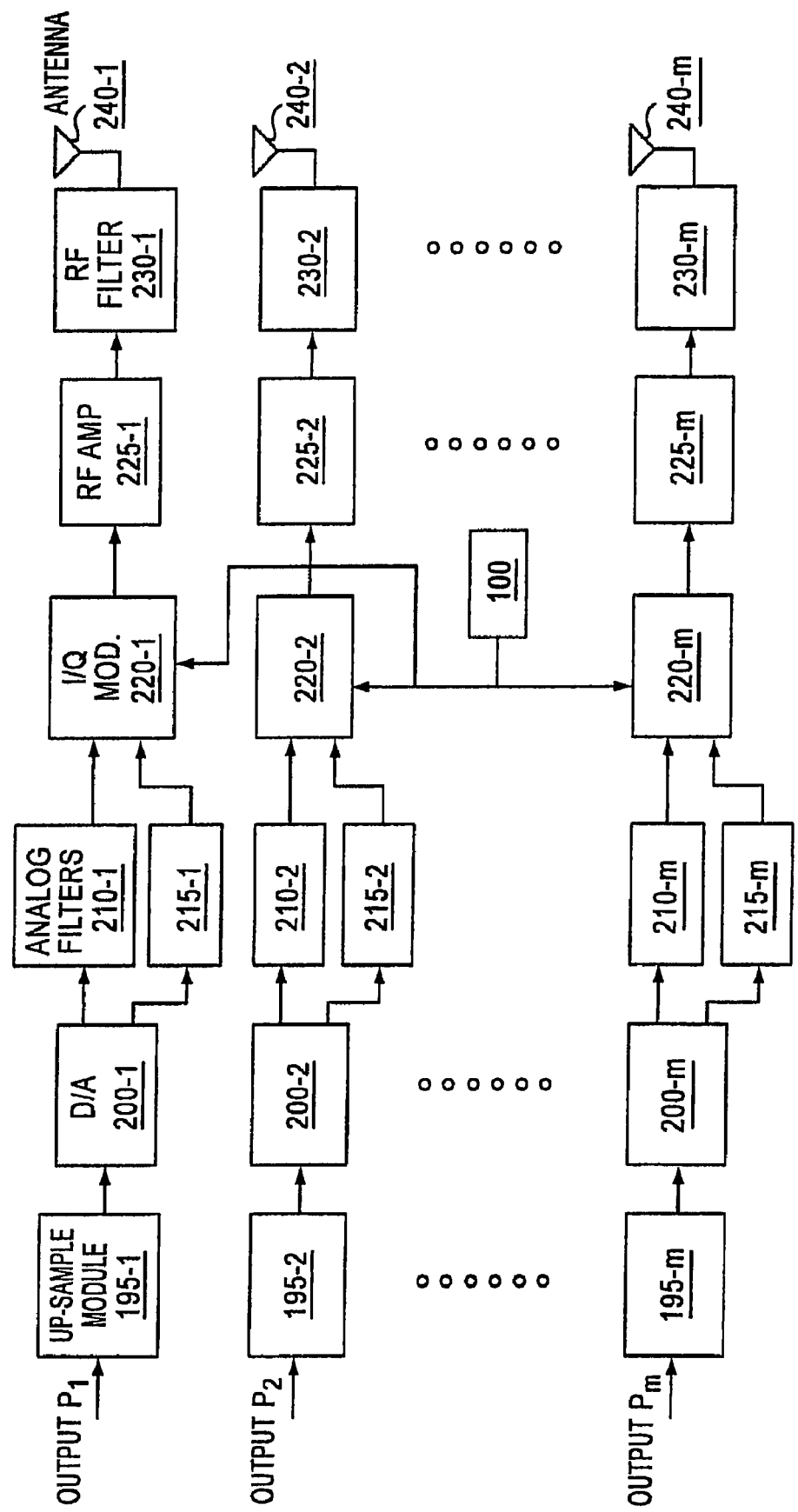

FIGS. 3(a) and 3(b) illustrate a schematic block diagram of a multiple transmitter in accordance with the present invention. In FIG. 3(a), the baseband processing is shown to include a scrambler 172, channel encoder 174, interleaver 176, demultiplexer 170, a plurality of symbol mappers 180-1 through 180-m, a space/time encoder 190 and a plurality of inverse fast Fourier transform (IFFT)/cyclic prefix addition modules 192-1 through 192-m. The baseband portion of the transmitter may further include a mode manager module 175 that receives the mode selection signal and produces settings for the radio transmitter portion and produces the rate selection for the baseband portion.

In operation, the scrambler 172 adds (in GF2) a pseudo random sequence to the outbound data bits 87 to make the data appear random. A pseudo random sequence may be generated from a feedback shift register with the generator polynomial, for example, of $S(x)=x^7+x^4+1$ to produce scrambled data. The channel encoder 174 receives the scrambled data and generates a new sequence of bits with redundancy. This will enable improved detection at the receiver. The channel encoder 174 may operate in one of a plurality of modes. For example, for backward compatibility with standards such as IEEE 802.11(a) and IEEE 802.11(g), the channel encoder has the form of a rate ½ convolutional encoder with 64 states and a generator polynomials of $G_0=133_8$ and $G_1=171_8$. The output of the convolutional encoder may be punctured to rates of ½, ⅔rds and ¾ according to the specified rate tables. For backward compatibility with IEEE 802.11(b) and the CCK modes of IEEE 802.11(g), the channel encoder has the form of a CCK code as defined in IEEE 802.11(b). For higher data rates, the channel encoder may use the same convolution encoding as described above or it may use a more powerful code, including a convolutional code with more states, a parallel concatenated (turbo) code and/or a low density parity check (LDPC) block code. Further, any one of these codes may be combined with an outer Reed Solomon code. Based on a balancing of performance, backward compatibility and low latency, one or more of these codes may be optimal.

The interleaver 176 receives the encoded data and spreads it over multiple symbols and transmit streams. This allows improved detection and error correction capabilities at the receiver. In one embodiment, the interleaver 176 will follow the IEEE 802.11(a) or (g) standard in the backward compatible modes. For higher performance modes, the interleaver will interleave data over multiple transmit streams. The demultiplexer 170 converts the serial interleave stream from interleaver 176 into M-parallel streams for transmission.

Each symbol mapper 180-1 through 180-m receives a corresponding one of the M-parallel paths of data from the demultiplexer. Each symbol mapper locks maps bit streams to quadrature amplitude modulated QAM symbols (e.g., BPSK, QPSK, 16 QAM, 64 QAM, 256 QAM, et cetera) according to the rate tables. For IEEE 802.11(a) backward compatibility, double gray coding may be used.

The map symbols produced by each of the symbol mappers 180-1 through 180-m are provided to the space/time encoder 190. Thereafter, output symbols are provided to the IFFT/cyclic prefix addition modules 192-1 through 192-m, which performs frequency domain to time domain conversions and adds a prefix, which allows removal of inter-symbol interference at the receiver. In general, a 64-point IFFT will be used for 20 MHz channels and 128-point IFFT will be used for 40 MHz channels In one embodiment, the number of M-input paths will equal the number of P-output paths. In another embodiment, the number of output paths P will equal M+1 paths. For each of the paths, the space/time encoder multiples the input symbols with an encoding matrix that has the form of:

$$\begin{bmatrix} C_1 & -C_2^* & C_3 & \ldots & -C_{2M}^* \\ C_2 & C_1^* & C_4 & \ldots & C_{(2M-1)}^* \end{bmatrix}$$

Note that the rows of the encoding matrix correspond to the number of input paths and the columns correspond to the number of output paths.

FIG. 3(b) illustrates the radio portion of the transmitter that includes a plurality of digital filter/up-sampling modules 195-1 through 195-m, digital-to-analog conversion modules 200-1 through 200-m, analog filters 210-1 through 210-m and 215-1 through 215-m, I/Q modulators 220-1 through 220-m, RF amplifiers 225-1 through 225-m, RF filters 230-1 through 230-m and antennas 240-1 through 240-m. The P-outputs from the other stage are received by respective digital filtering/up-sampling modules 195-1 through 195-m.

In operation, the number of radio paths that are active correspond to the number of P-outputs. For example, if only one P-output path is generated, only one of the radio transmitter paths will be active. As one of average skill in the art will appreciate, the number of output paths may range from one to any desired number.

The digital filtering/up-sampling modules 195-1 through 195-m filter the corresponding symbols and adjust the sampling rates to correspond with the desired sampling rates of the digital-to-analog conversion modules 200-1 through 200-m. The digital-to-analog conversion modules 200-1 through 200-m convert the digital filtered and up-sampled signals into corresponding in-phase and quadrature analog signals. The analog filters 210-1 through 210-m and 215-1 through 215-m filter the corresponding in-phase and/or quadrature components of the analog signals, and provide the filtered signals to the corresponding I/Q modulators 220-1 through 220-m. The I/Q modulators 220-1 through 220-m based on a local oscillation, which is produced by a local oscillator 100, up-converts the I/Q signals into radio frequency signals. The RF amplifiers 225-1 through 225-m amplify the RF signals which are then subsequently filtered via RF filters 230-1 through 230-m before being transmitted via antennas 240-1 through 240-m.

Figure 4A:
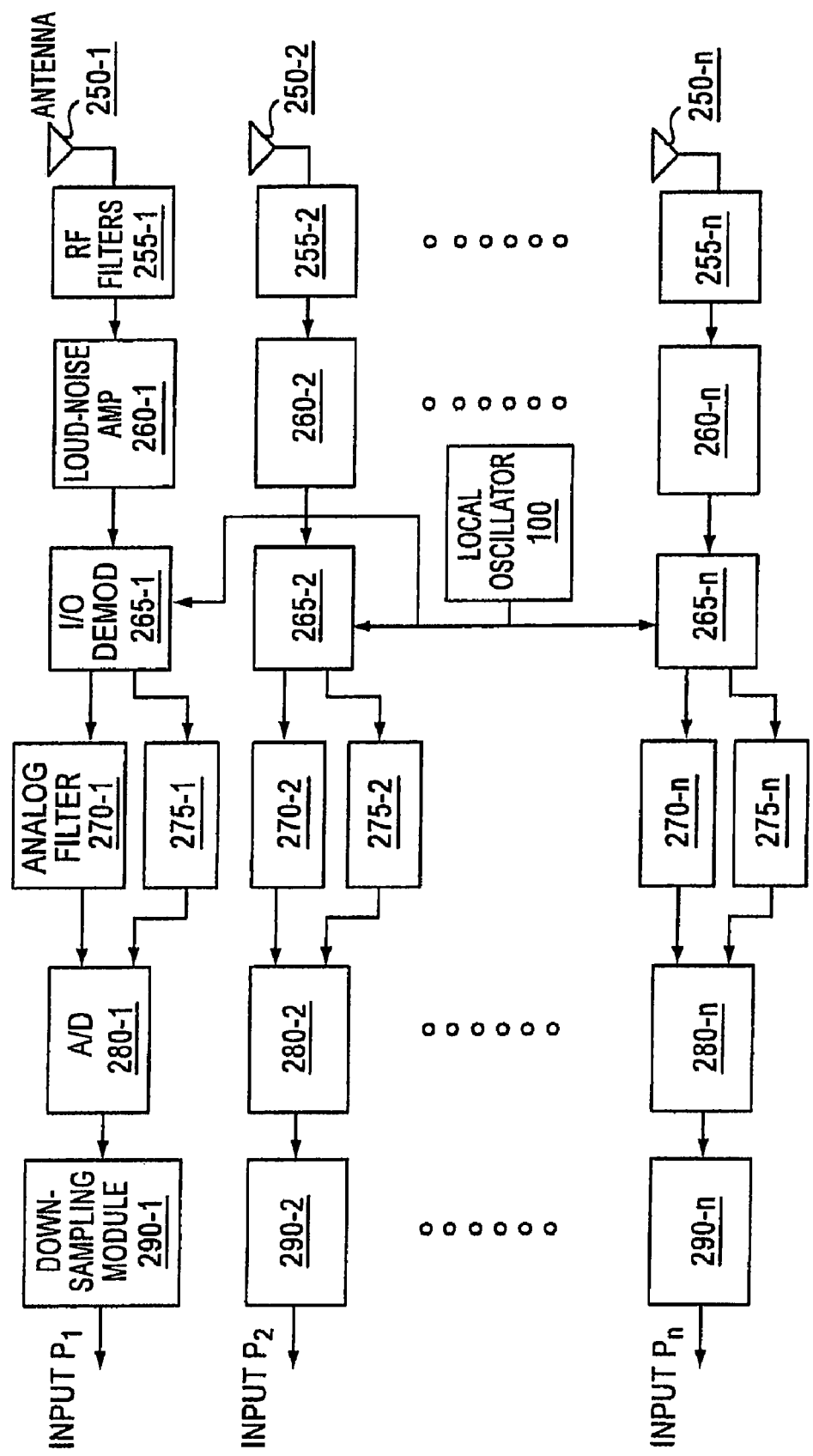
FIGS. 4(a) and 4(b) are a schematic block diagram of a receiver in accordance with one embodiment of the present invention.
Figure 4B:
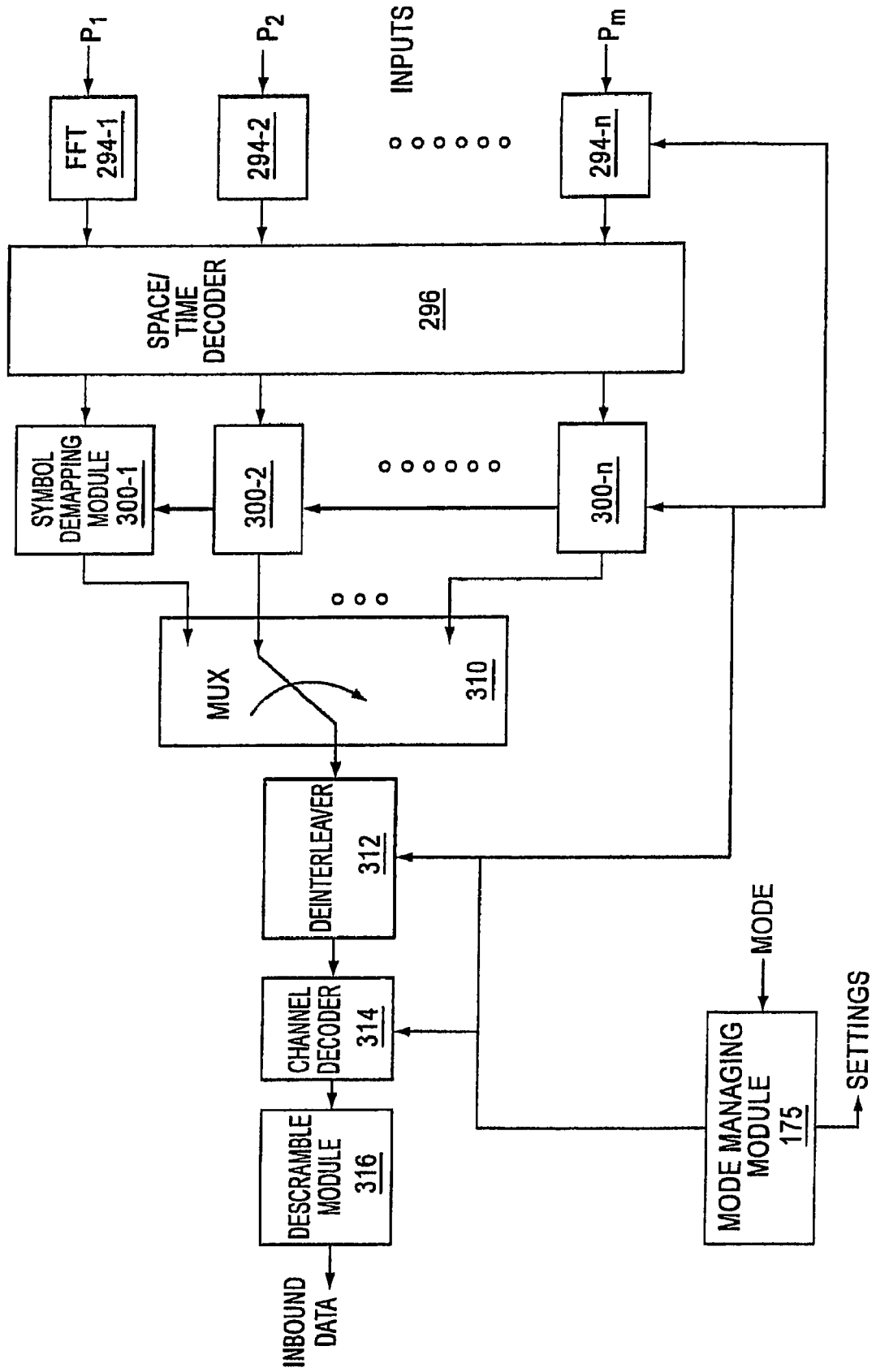

FIGS. 4(a) and 4(b) illustrate a schematic block diagram of another embodiment of a receiver in accordance with the present invention. FIG. 4(a) illustrates the analog portion of the receiver which includes a plurality of receiver paths. Each receiver path includes an antenna 250-1 through 250-n, RF filters 255-1 through 255-n, low noise amplifiers 260-1 through 260-n, I/O demodulators 265-1 through 265-n, analog filters 270-1 through 270-n and 275-1 through 275-n, analog-to-digital converters 280-1 through 280-n and digital filters and down-sampling modules 290-1 through 290-n.

In operation, the antennas 250-1 through 250-n receive inbound RF signals, which are band-pass filtered via the RF filters 255-1 through 255-n. The corresponding low noise amplifiers 260-1 through 260-n amplify the filtered signals and provide them to the corresponding I/Q demodulators 265-1 through 265-n. The I/Q demodulators 265-1 through 265-n, based on a local oscillation, which is produced by local oscillator 100, down-converts the RF signals into baseband in-phase and quadrature analog signals.

The corresponding analog filters 270-1 through 270-n and 275-1 through 275-n filter the in-phase and quadrature analog components, respectively. The analog-to-digital converters 280-1 through 280-n convert the in-phase and quadrature analog signals into a digital signal. The digital filtering and down-sampling modules 290-1 through 290-n filter the digital signals and adjust the sampling rate to correspond to the rate of the baseband processing, which will be described in FIG. 4(b).

FIG. 4(b) illustrates the baseband processing of a receiver. The baseband processing portion includes a plurality of fast Fourier transform (FFT)/cyclic prefix removal modules 294-1 through 294-n, a space/time decoder 296, a plurality of symbol demapping modules 300-1 through 300-n, a multiplexer 310, a deinterleaver 312, a channel decoder 314, and a descramble module 316. The baseband processing module may further include a mode managing module 175. The receiver paths are processed via the FFT/cyclic prefix removal modules 294-1 through 294-n which perform the inverse function of the IFFT/cyclic prefix addition modules 192-1 through 192-m to produce frequency domain symbols as M-output paths. The space/time decoding module 296, which performs the inverse function of space/time encoder 190, receives the M-output paths.

The symbol demapping modules 300-1 through 300-n convert the frequency domain symbols into data utilizing an inverse process of the symbol mappers 180-1 through 180-m. The multiplexer 310 combines the demapped symbol streams into a single path.

The deinterleaver 312 deinterleaves the single path utilizing an inverse function of the function performed by interleaver 176. The deinterleaved data is then provided to the channel decoder 314 which performs the inverse function of channel encoder 174. The descrambler 316 receives the decoded data and performs the inverse function of scrambler 172 to produce the inbound data 98.

Figure 5:
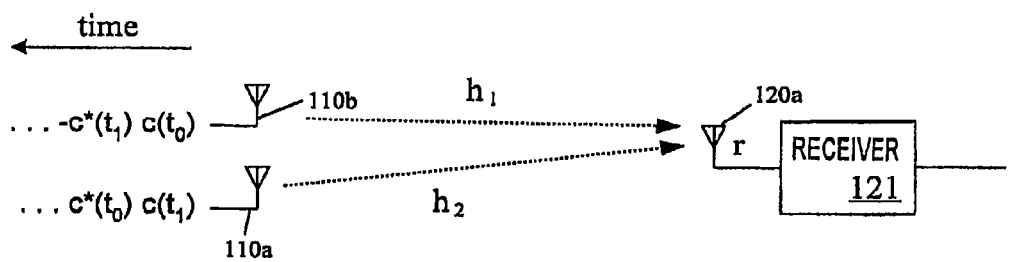
FIG. 5 is a diagram illustrating a Space-Time Block Coding (STBC) method, in accordance with one embodiment of the present invention.

FIG. 5 is a basic diagram illustrating one embodiment of STBC realization or transmission by the receiver 121. In this embodiment, a first antenna 110b of a transmitting device transmits a first complex training signal (e.g., $-c^*(t_1) c(t_0)$, where $c(t)$ represents a long training sequence and "*" represents a conjugate function) and a second antenna 110a of the transmitting device transmits a second complex training signal (e.g., $c^*(t_0) c(t_1)$). In this way, the input modulation signals will be shown as described in equation (3) below.

The receiver 121 receives via antenna 120a the complex training signals, which is represented by "r". For data processing, "r" may be expressed as:

$$\begin{bmatrix} r(t_0) \\ r^*(t_1) \end{bmatrix} = \begin{bmatrix} h_1 & h_2 \\ h_2^* & -h_1^* \end{bmatrix} \begin{bmatrix} c(t_0) \\ c(t_1) \end{bmatrix} + \begin{bmatrix} n_1 \\ n_2 \end{bmatrix}$$

For channel estimation, this equation may be written as:

$$\begin{bmatrix} r(t_0) \\ r(t_1) \end{bmatrix} = \begin{bmatrix} c(t_0) & c(t_1) \\ -c^*(t_1) & c^*(t_0) \end{bmatrix} \begin{bmatrix} h_1 \\ h_2 \end{bmatrix} + \begin{bmatrix} n_1 \\ n_2 \end{bmatrix} = C \times \begin{bmatrix} h_1 \\ h_2 \end{bmatrix} + \begin{bmatrix} n_1 \\ n_2 \end{bmatrix} \quad (2)$$

From this equation, the channel may be estimated using STBC, which can be expressed as:

$$\begin{bmatrix} \tilde{h}_1 \\ \tilde{h}_2 \end{bmatrix} = C^* \times \begin{bmatrix} r(t_0) \\ r(t_1) \end{bmatrix} = \begin{bmatrix} \sum_{i=1}^{2} |c(t_i)|^2 & 0 \\ 0 & \sum_{i=1}^{2} |c(t_i)|^2 \end{bmatrix} \times \begin{bmatrix} h_1 \\ h_2 \end{bmatrix} + \begin{bmatrix} \tilde{n}_1 \\ \tilde{n}_2 \end{bmatrix}. \quad (3)$$

When the training sequence, i.e., $c(t)$, in a Long Training Sequence (LTS) is known, $h_1$ and $h_2$ can be found from equation (3).

For the data process, the receiver 121 receives the complex signals, which is represented by "r". The equation of "r" may be expressed as:

$$\begin{bmatrix} r(t_0) \\ r^*(t_1) \end{bmatrix} = \begin{bmatrix} h_1 & h_2 \\ h_2^* & -h_1^* \end{bmatrix} \begin{bmatrix} c(t_0) \\ c(t_1) \end{bmatrix} + \begin{bmatrix} n_1 \\ n_2 \end{bmatrix} = H \times \begin{bmatrix} c(t_0) \\ c(t_1) \end{bmatrix} + \begin{bmatrix} n_1 \\ n_2 \end{bmatrix} \quad (4)$$

After STBC decoding:

$$\begin{bmatrix} \tilde{c}(t_0) \\ \tilde{c}(t_1) \end{bmatrix} = H^* \times \begin{bmatrix} r(t_0) \\ r^*(t_1) \end{bmatrix} = \begin{bmatrix} \sum_{i=1}^{2} |h_i|^2 & 0 \\ 0 & \sum_{i=1}^{2} |h_i|^2 \end{bmatrix} \times \begin{bmatrix} c(t_0) \\ c(t_1) \end{bmatrix} + \begin{bmatrix} \tilde{n}_1 \\ \tilde{n}_2 \end{bmatrix} \quad (5)$$

Figure 7:
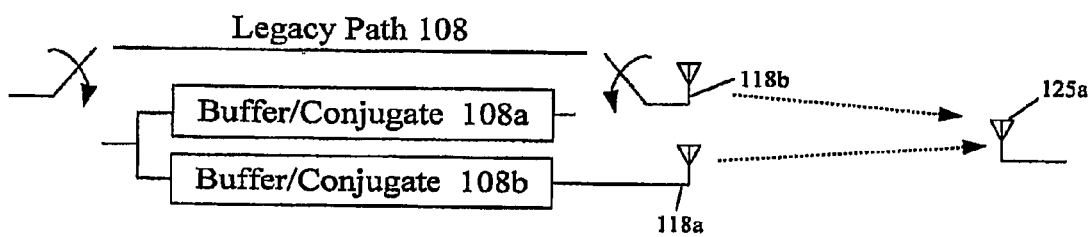
FIG. 7 is a diagram of a transmitter configuration, in accordance with one embodiment of the present invention.

FIG. 7 is a simplified diagram of the transmitter 67, 69, 71 to produce the first and second complex signals of FIG. 5. With the buffers/conjugate functions being selectable, the transmitter may operate in a variety of modes. For example, when the switch is selects the legacy path 108, the transmitter operates as a legacy IEEE 802.11a and 802.11g, i.e. "11a/g", transmitter. That is to say, only antenna 118b is used to transmit signals to the receive antenna 125a.

When the switch is in the alternate position, the transmitter operates with STBC. The buffer/conjugate functions, 108a and 108b, are utilized in this latter mode so that the code signals illustrated in FIG. 5 may be transmitted using antennas 118a and 118b. It is noted that the function illustrated in FIG. 7 is performed by the space/time encoder 190. As such, the transmitter can be chosen to be legacy system or STBC system by an external switch.

Figure 6:
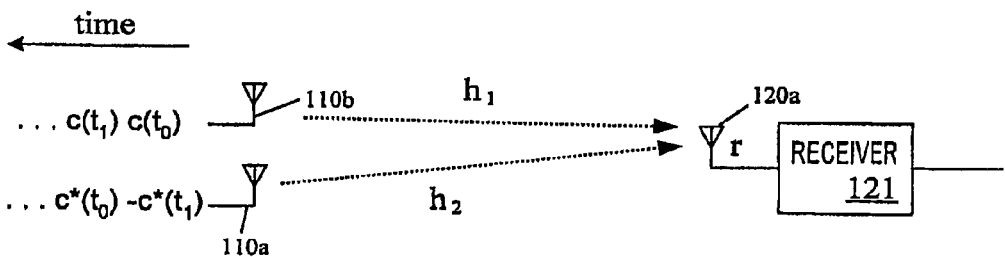
FIG. 6 is a diagram illustrating another Space-Time Block Coding (STBC) method used in channel estimation and communication of data, in accordance with one embodiment of the present invention.

FIG. 6 is a basic diagram illustrating another embodiment of STBC realization or transmission by the receiver 121. In this embodiment, a first antenna 110b of a transmitting device transmits a first complex training signal (e.g., $c(t_1)$ $c(t_0)$, where c(t) represents a long training sequence and "*" represents a conjugate function) and a second antenna 110a of the transmitting device transmits a second complex training signal (e.g., $c^*(t_0)$ $-c^*(t_1)$).

In one embodiment, the number of M-input paths will equal the number of P-output paths. In another embodiment, the number of output paths P will equal M+1 paths. For each of the paths, the space/time encoder multiplies the input symbols with an encoding matrix that has the form of:

$$\begin{bmatrix} C_1 & C_2 & C_3 & \ldots & C_{2M} \\ -C_2^* & C_1^* & -C_4^* & \ldots & C_{(2M-1)}^* \end{bmatrix}$$

Note that the rows of the encoding matrix correspond to the number of input paths and the columns correspond to the number of output paths.

The receiver 121 receives the complex training signals, which is represented by "r". For channel estimation, "r" may be expressed as:

$$\begin{bmatrix} r(t_0) \\ r(t_1) \end{bmatrix} = \begin{bmatrix} c(t_0) & -c^*(t_1) \\ c(t_1) & c^*(t_0) \end{bmatrix}\begin{bmatrix} h_1 \\ h_2 \end{bmatrix} + \begin{bmatrix} n_1 \\ n_2 \end{bmatrix} = C \times \begin{bmatrix} h_1 \\ h_2 \end{bmatrix} + \begin{bmatrix} n_1 \\ n_2 \end{bmatrix}. \quad (6)$$

From this equation, the channel may be estimated using STBC, which can be expressed as:

$$\begin{bmatrix} \tilde{h}_1 \\ \tilde{h}_2 \end{bmatrix} = C^* \times \begin{bmatrix} r(t_0) \\ r(t_1) \end{bmatrix} = \begin{bmatrix} \sum_{i=1}^{2}|c(t_i)|^2 & 0 \\ 0 & \sum_{i=1}^{2}|c(t_i)|^2 \end{bmatrix} \times \begin{bmatrix} h_1 \\ h_2 \end{bmatrix} + \begin{bmatrix} \tilde{n}_1 \\ \tilde{n}_2 \end{bmatrix}. \quad (7)$$

When the training sequence, i.e., c(t), in the Long Training Sequence (LTS) is known, $h_1$ and $h_2$ can be found from equation (7).

In this embodiment, a first antenna 110b of a transmitting device transmits a first complex signal (e.g., $c(t_1)$ $c(t_0)$, where c(t) represents a long training sequence and "*" represents a conjugate function) and a second antenna 110a of the transmitting device transmits a second complex signal (e.g., $c^*(t_0)$ $-c^*(t_1)$).

The receiver 121 receives the complex signals, which is represented by "r". The equation of "r" may be expressed as:

$$\begin{bmatrix} r(t_0) \\ r^*(t_1) \end{bmatrix} = \begin{bmatrix} h_1 & -h_2 \\ h_2^* & h_1^* \end{bmatrix}\begin{bmatrix} c(t_0) \\ c^*(t_1) \end{bmatrix} + \begin{bmatrix} n_1 \\ n_2 \end{bmatrix} = H \times \begin{bmatrix} c(t_0) \\ c^*(t_1) \end{bmatrix} + \begin{bmatrix} n_1 \\ n_2 \end{bmatrix} \quad (8)$$

By keeping $c(t_0)$, but conjugate on $c^*(t_1)$, after STBC decoding, yields:

$$\begin{bmatrix} \tilde{c}(t_0) \\ \tilde{c}^*(t_1) \end{bmatrix} = H^* \times \begin{bmatrix} r(t_0) \\ r^*(t_1) \end{bmatrix} = \begin{bmatrix} \sum_{i=1}^{2}|h_i|^2 & 0 \\ 0 & \sum_{i=1}^{2}|h_i|^2 \end{bmatrix} \times \begin{bmatrix} c(t_0) \\ c^*(t_1) \end{bmatrix} + \begin{bmatrix} \tilde{n}_1 \\ \tilde{n}_2 \end{bmatrix} \quad (9)$$

Figures 8, 9, 10:
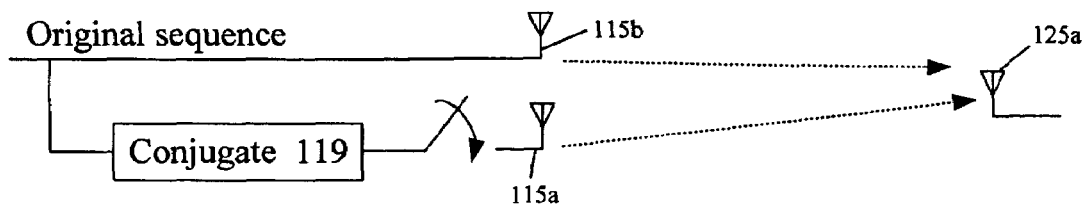
FIG. 8 is another diagram of a transmitter configuration, in accordance with one embodiment of the present invention.
FIG. 9 provides a diagram of a packet structure for legacy systems, in accordance with one embodiment of the present invention.
FIG. 10 provides another diagram of a packet structure for MIMO systems, in accordance with one embodiment of the present invention.

FIG. 8 is a simplified diagram of the transmitter 67, 69, 71 to produce the first and second complex signals of FIG. 6. With the conjugate function 119 being selectable, the transmitter may operate in a variety of modes. For example, when the switch is opened, the transmitter operates as a legacy IEEE 802.11a and 802.11g, i.e. "11a/g", transmitter. That is to say, only antenna 115b is used to transmit signals to the receive antenna 125a. When the switch is closed, the transmitter operates with STBC using antennas 115a and 115b. As such, the transmitter can be chosen to be legacy system or STBC system by external switch.

FIG. 9 is a diagram of a packet structure when the switch is open (i.e., the transmitter is acting as a legacy transmitter). In this mode, a 11a/g legacy receiver can receive the packet. Further, STBC compliant receivers can detect Short Training Sequence (STS) 1001 and know there is one transmit antenna (detect legacy mode), then process the packet, bypassing STBC mode. The preamble also includes a Long Training Sequence (LTS) 1002, a signal 1003 and data 1005. The STS is used for signal detection and frequency offset estimation and the LTS is used for channel estimation. Still further, both a 11a/g legacy receiver and a STBC compliant receiver can receive the legacy 11a/g packet.

FIG. 10 is a diagram of a packet structure when the switch is closed (i.e., the transmitter is using the STBC). In this mode, STS 1001 is cyclic shifted per each transmit antenna. The MAC (firmware) of transmitter can add LTS 1006 in front of Data 1007 for the packet. Further, an STBC compliant receiver can detect STS (or 2nd LTS after Signal), and know there are two transmit antennas, then process the packet with STBC mode.

Although the invention has been described based upon these preferred embodiments, it would be apparent to those skilled in the art that certain modifications, variations, and alternative constructions would be apparent, while remaining within the spirit and scope of the invention. In order to determine the metes and bounds of the invention, therefore, reference should be made to the appended claims.

What is claimed is:

1. A method of communicating data to a single receiving antenna from N transmitting antennas, where N is an integer, the method comprising the steps of:
    performing by at least one computing device:
        determining whether a legacy transmission mode has been selected, wherein N equals 1 when the legacy transmission mode has been selected and N is greater than 1 when the legacy transmission mode has not been selected;

producing N data streams from outbound data;
applying the N data streams to a space/time encoder to produce N encoded signals; and
transmitting the N encoded signals from N transmitting antennas to the single receiving antenna;
wherein the legacy transmission mode allows receivers to receive and process transmitted signals when the receivers are only configured to receive the transmitted signals from a single transmitting antenna.

2. The method of claim 1, wherein when the legacy transmission mode has not been selected, the step of applying the N data streams to the space/time encoder comprises producing at least one conjugate encoded signal.

3. The method of claim 1, wherein when the legacy transmission mode has not been selected, the step of applying the N data streams to the space/time encoder comprises adding a Long Training Sequence immediately before data in a frame.

4. The method of claim 3, wherein the step of adding a Long Training Sequence is performed such that a receiver processor will process the frame in a Space/Time Block Coding mode.

5. The method of claim 1, wherein when the legacy transmission mode has not been selected, the step of applying the N data streams to the space/time encoder comprises encoding the two data streams so that channel estimates can be performed by the receivers according to:

$$\begin{bmatrix}\tilde{h}_1\\\tilde{h}_2\end{bmatrix}=C^*\times\begin{bmatrix}r(t_0)\\r(t_1)\end{bmatrix}=\begin{bmatrix}\sum_{i=1}^{2}|c(t_i)|^2 & 0\\0 & \sum_{i=1}^{2}|c(t_i)|^2\end{bmatrix}\times\begin{bmatrix}h_1\\h_2\end{bmatrix}+\begin{bmatrix}\tilde{n}_1\\\tilde{n}_2\end{bmatrix}, \text{ where}$$

$$\begin{bmatrix}r(t_0)\\r(t_1)\end{bmatrix}=\begin{bmatrix}c(t_0) & -c^*(t_1)\\c(t_1) & c^*(t_0)\end{bmatrix}\begin{bmatrix}h_1\\h_2\end{bmatrix}+\begin{bmatrix}n_1\\n_2\end{bmatrix}=C\times\begin{bmatrix}h_1\\h_2\end{bmatrix}+\begin{bmatrix}n_1\\n_2\end{bmatrix}$$

where $r_i(t)$ and $c_i(t)$ are the received and transmitted signals, respectively, $n_i$ represent noise terms and $h_i$ represents relationships between signals sent from the two transmitting antennas to the single receiving antenna.

6. A method according to claim 5, wherein the step of applying the N data streams to the space/time encoder comprises encoding the two data streams so that data can be retrieved by the receivers according to:

$$\begin{bmatrix}\tilde{c}(t_0)\\\tilde{c}^*(t_1)\end{bmatrix}=H^*\times\begin{bmatrix}r(t_0)\\r^*(t_1)\end{bmatrix}=\begin{bmatrix}\sum_{i=1}^{2}|h_i|^2 & 0\\0 & \sum_{i=1}^{2}|h_i|^2\end{bmatrix}\times\begin{bmatrix}c(t_0)\\c^*(t_1)\end{bmatrix}+\begin{bmatrix}\tilde{n}_1\\\tilde{n}_2\end{bmatrix}.$$

7. A method according to claim 1, wherein when the legacy transmission mode has been selected, the receivers which are capable of processing a data frame in a Space/Time Block Coding mode bypass the Space/Time Block Coding mode.

8. A method according to claim 1, wherein the receivers that are only configured to receive the transmitted signals from a single transmitting antenna comprise receivers that comply with standards of IEEE 802.11.

9. A transmitter for communicating data to a single receiving antenna from N transmitting antennas, where N is an integer, comprising:

determining means for determining whether a legacy transmission mode has been selected, wherein N equals 1 when the legacy transmission mode has been selected and N is greater than 1 when the legacy transmission mode has not been selected;
producing means for producing N data streams from outbound data;
encoding means for space/time encoding the N data streams to produce N encoded signals; and
N transmitting antenna means for transmitting the N encoded signals to the single receiving antenna;
wherein the legacy transmission mode allows receivers to receive and process transmitted signals when the receivers are only configured to receive the transmitted signals from a single transmitting antenna.

10. The transmitter of claim 9, wherein the encoding means is configured to produce at least one conjugate encoded signal, when the legacy transmission mode has not been selected.

11. The transmitter of claim 9, wherein the encoding means is configured to add a Long Training Sequence immediately before data in a frame, wherein when the legacy transmission mode has not been selected.

12. The transmitter of claim 11, wherein the encoding means is configured to add a Long Training Sequence such that a receiver processor will process the frame in a Space/Time Block Coding mode.

13. The transmitter of claim 9, wherein when the legacy transmission mode has not been selected, the encoding means is configured to encode the two data streams so that channel estimates can be performed by the receivers according to:

$$\begin{bmatrix}\tilde{h}_1\\\tilde{h}_2\end{bmatrix}=C^*\times\begin{bmatrix}r(t_0)\\r(t_1)\end{bmatrix}=\begin{bmatrix}\sum_{i=1}^{2}|c(t_i)|^2 & 0\\0 & \sum_{i=1}^{2}|c(t_i)|^2\end{bmatrix}\times\begin{bmatrix}h_1\\h_2\end{bmatrix}+\begin{bmatrix}\tilde{n}_1\\\tilde{n}_2\end{bmatrix}, \text{ where}$$

$$\begin{bmatrix}r(t_0)\\r(t_1)\end{bmatrix}=\begin{bmatrix}c(t_0) & -c^*(t_1)\\c(t_1) & c^*(t_0)\end{bmatrix}\begin{bmatrix}h_1\\h_2\end{bmatrix}+\begin{bmatrix}n_1\\n_2\end{bmatrix}=C\times\begin{bmatrix}h_1\\h_2\end{bmatrix}+\begin{bmatrix}n_1\\n_2\end{bmatrix}$$

where $r_i(t)$ and $c_i(t)$ are the received and transmitted signals, respectively, $n_i$ represent noise terms and $h_i$ represents relationships between signals sent from the two transmitting antennas to the single receiving antenna.

14. A transmitter according to claim 13, wherein the encoding means is configured to encode the two data streams so that data can be retrieved by the receivers according to:

$$\begin{bmatrix}\tilde{c}(t_0)\\\tilde{c}^*(t_1)\end{bmatrix}=H^*\times\begin{bmatrix}r(t_0)\\r^*(t_1)\end{bmatrix}=\begin{bmatrix}\sum_{i=1}^{2}|h_i|^2 & 0\\0 & \sum_{i=1}^{2}|h_i|^2\end{bmatrix}\times\begin{bmatrix}c(t_0)\\c^*(t_1)\end{bmatrix}+\begin{bmatrix}\tilde{n}_1\\\tilde{n}_2\end{bmatrix}.$$

15. A transmitter according to claim 9, wherein the encoding means is configured to encode the data streams such that the receivers which are capable of processing a data frame in a Space/Time Block Coding mode bypass the Space/Time Block Coding mode, when the legacy transmission mode has been selected.

16. A transmitter according to claim 9, wherein the receivers that are only configured to receive the transmitted signals from a single transmitting antenna comprise receivers that comply with standards of IEEE 802.11.

17. A transmitter for communicating data to a single receiving antenna from N transmitting antennas, where N is an integer, comprising:
- a legacy switch indicator, configured to determine whether a legacy transmission mode has been selected, wherein N equals 1 when the legacy transmission mode has been selected and N is greater than 1 when the legacy transmission mode has not been selected;
- a demultiplexer, configured to produce N data streams from outbound data;
- a space/time encoder, configured to encode the N data streams to produce N encoded signals; and
- N transmit antennas, configured to transmit the N encoded signals to the single receiving antenna;
- wherein the legacy transmission mode allows receivers to receive and process transmitted signals when the receivers are only configured to receive the transmitted signals from a single transmitting antenna.

18. The transmitter of claim 17, wherein the space/time encoder is configured to produce at least one conjugate encoded signal, when the legacy transmission mode has not been selected.

19. The transmitter of claim 17, wherein the space/time encoder is configured to add a Long Training Sequence immediately before data in a frame, wherein when the legacy transmission mode has not been selected.

20. The transmitter of claim 19, wherein the space/time encoder is configured to add a Long Training Sequence such that a receiver processor will process the frame in a Space/Time Block Coding mode.

21. The transmitter of claim 17, wherein when the legacy transmission mode has not been selected, wherein the space/time encoder is configured to encode the two data streams so that channel estimates can be performed by the receivers according to:

$$\begin{bmatrix} \tilde{h}_1 \\ \tilde{h}_2 \end{bmatrix} = C^* \times \begin{bmatrix} r(t_0) \\ r(t_1) \end{bmatrix} = \begin{bmatrix} \sum_{i=1}^{2} |c(t_i)|^2 & 0 \\ 0 & \sum_{i=1}^{2} |c(t_i)|^2 \end{bmatrix} \times \begin{bmatrix} h_1 \\ h_2 \end{bmatrix} + \begin{bmatrix} \tilde{n}_1 \\ \tilde{n}_2 \end{bmatrix}, \text{ where}$$

$$\begin{bmatrix} r(t_0) \\ r(t_1) \end{bmatrix} = \begin{bmatrix} c(t_0) & -c^*(t_1) \\ c(t_1) & c^*(t_0) \end{bmatrix} \begin{bmatrix} h_1 \\ h_2 \end{bmatrix} + \begin{bmatrix} n_1 \\ n_2 \end{bmatrix} = C \times \begin{bmatrix} h_1 \\ h_2 \end{bmatrix} + \begin{bmatrix} n_1 \\ n_2 \end{bmatrix}$$

where $r_i(t)$ and $c_i(t)$ are the received and transmitted signals, respectively, $n_i$ represent noise terms and $h_1$ represents relationships between signals sent from the two transmitting antennas to the single receiving antenna.

22. A transmitter according to claim 21, wherein the space/time encoder is configured to encode the two data streams so that data can be retrieved by the receivers according to:

$$\begin{bmatrix} \tilde{c}(t_0) \\ \tilde{c}^*(t_1) \end{bmatrix} = H^* \times \begin{bmatrix} r(t_0) \\ r^*(t_1) \end{bmatrix} = \begin{bmatrix} \sum_{i=1}^{2} |h_i|^2 & 0 \\ 0 & \sum_{i=1}^{2} |h_i|^2 \end{bmatrix} \times \begin{bmatrix} c(t_0) \\ c^*(t_1) \end{bmatrix} + \begin{bmatrix} \tilde{n}_1 \\ \tilde{n}_2 \end{bmatrix}.$$

23. A transmitter according to claim 17, wherein the space/time encoder is configured to encode the data streams such that the receivers which are capable of processing a data frame in a Space/Time Block Coding mode bypass the Space/Time Block Coding mode, when the legacy transmission mode has been selected.

24. A transmitter according to claim 17, wherein the receivers that are only configured to receive the transmitted signals from a single transmitting antenna comprise receivers that comply with standards of IEEE 802.11.

* * * * *